United States Patent [19]

Knute

[11] 4,343,185
[45] Aug. 10, 1982

[54] TEMPERATURE SENSING PROBE AND DISPOSABLE PROBE COVER

[75] Inventor: Wallace L. Knute, Del Mar, Calif.

[73] Assignee: Ivac Corporation, San Diego, Calif.

[21] Appl. No.: 213,313

[22] Filed: Dec. 5, 1980

Related U.S. Application Data

[63] Continuation of Ser. No. 10,540, Feb. 9, 1979, abandoned.

[51] Int. Cl.³ .......................... G01K 1/16; G01K 7/16
[52] U.S. Cl. ................................................... 374/158
[58] Field of Search .............. 73/343 R, 362 AR, 359; 206/306; 338/28; 136/232, 233

[56] References Cited

U.S. PATENT DOCUMENTS

| | | | |
|---|---|---|---|
| 3,650,153 | 3/1972 | Schwab | 73/343 R |
| 3,738,479 | 6/1973 | Sato | 73/362 AR |
| 3,880,282 | 4/1975 | Naumann | 206/306 |
| 3,905,232 | 9/1975 | Knute | 73/362 AR |
| 3,929,018 | 12/1975 | Turner | 206/306 |
| 4,054,057 | 10/1977 | Kluge | 73/362 AR |
| 4,166,389 | 9/1979 | Montren | 73/343 R |

*Primary Examiner*—Charles A. Ruehl
*Assistant Examiner*—Denis E. Corr
*Attorney, Agent, or Firm*—Fulwider, Patton, Rieber, Lee & Utecht

[57] ABSTRACT

A temperature sensing probe is provided including a probe shaft rigidly mounted on a handle and having a temperature sensing tip at the distal end of the shaft. A disposable cover is provided in the form of a unitary elongated tube constructed of heat conductive material and having an open proximal end arranged to slide over the probe shaft and a closed distal end arranged to tightly engage the temperature sensing tip of the shaft in order to retain the cover on the shaft and provide a positive conduction of heat to the temperature sensing tip. For the purpose of selectively ejecting the cover after temperature measurement, the probe handle includes a movable ejection button for manually driving the cover forwardly with sufficient force to disengage the cover from the tight engagement with the temperature sensing tip.

6 Claims, 6 Drawing Figures

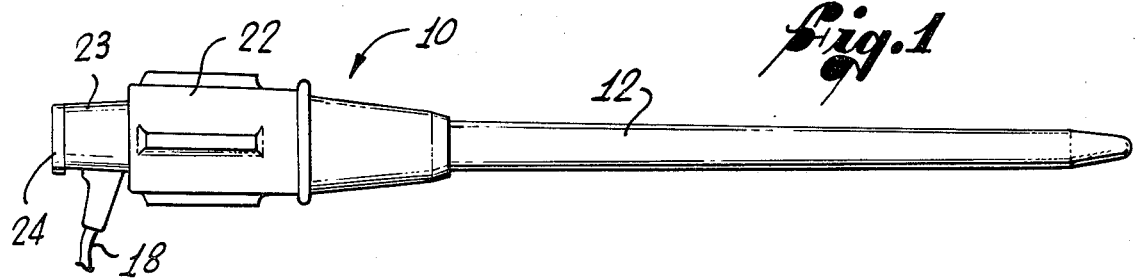
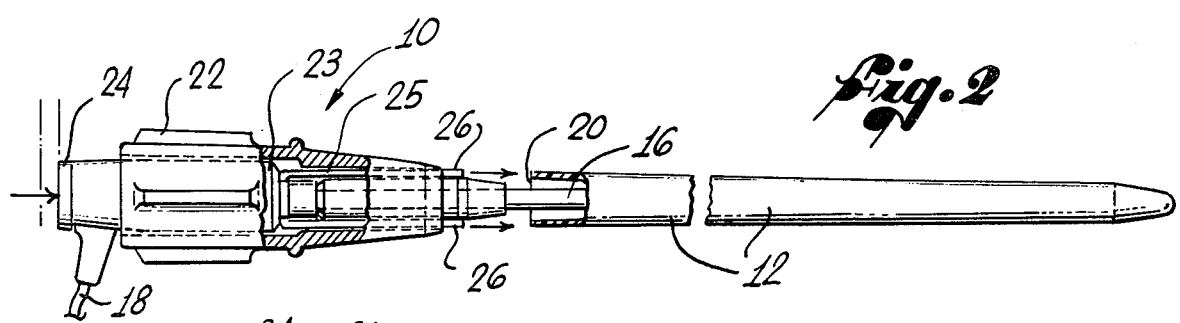
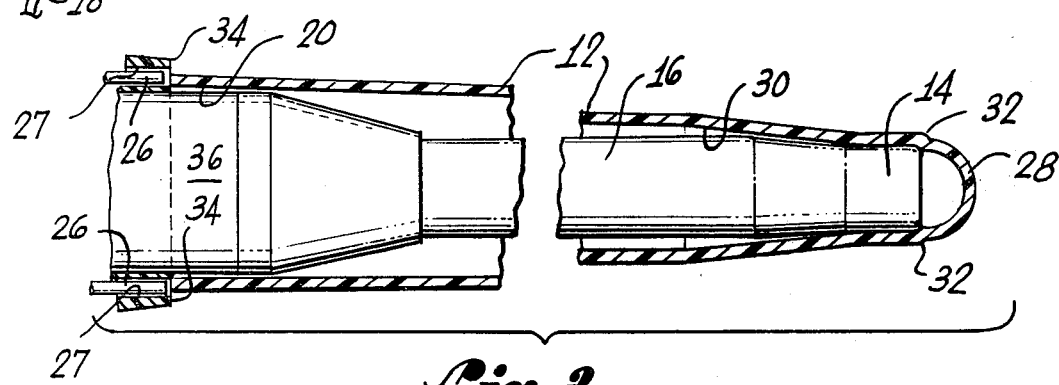
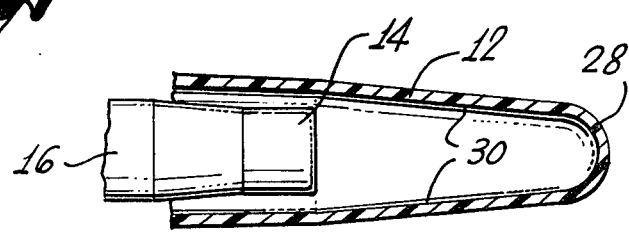
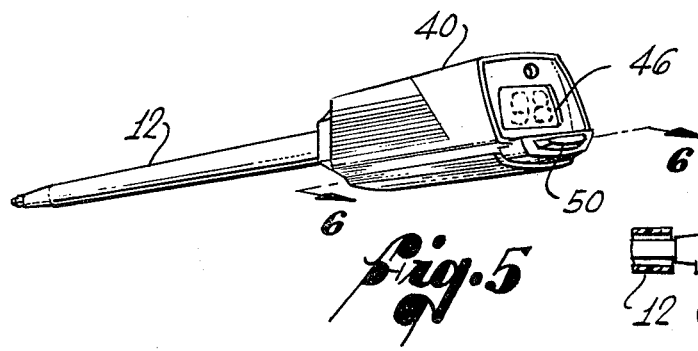
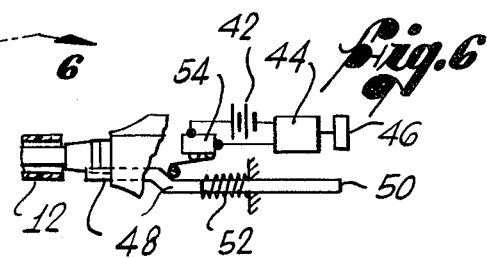

TEMPERATURE SENSING PROBE AND DISPOSABLE PROBE COVER

This is a continuation, of application Ser. No. 10,540, filed Feb. 9, 1979 now abandoned.

BACKGROUND OF THE INVENTION

This invention relates generally to improvements in thermometer devices and, more particularly, to a new and improved temperature sensing probe and disposable probe cover, the probe and cover being adapted for use with an electronic thermometer.

It is common practice in the medical arts, as in hospitals and in doctors' offices, to measure the body temperature of a patient by means of a glass bulb theremometer incorporating a heat responsive mercury column which expands and contracts adjacent a calibrated temperature scale. Typically, the glass thermometer is inserted into the patient, either orally or rectally, and subsequently removed after a sufficient time interval has passed to enable the temperature of the thermometer to stabilize at the body temperature of the patient. This time interval is usually of the order of 2 to 4 minutes. After a sufficient period of time has elapsed, the thermometer is removed from the patient and is subsequently read by appropriate medical personnel.

In order to make another temperature measurement, e.g., either on a second patient or on the same patient at a later time, a second, sterile thermometer must be used, or the first thermometer must be cleaned, sterilized and redistributed prior to reuse.

It will be apparent from the foregoing that conventional temperature measurement procedures using glass bulb thermometers are prone to a number of very significant deficiencies. In this connection, glass bulb thermometers are rather fragile devices which are easily broken and, indeed, such breakage is very common. In addition, temperature measurement is rather slow and, for patients who cannot be relied upon (by virtue of age or infirmity) to properly retain the thermometer for the necessary period of insertion in the body, may necessitate the physical presence of medical personnel during a relatively long measurement cycle, thus wasting valuable time. Furthermore, glass bulb thermometers are not as quick and easy to read, particularly under poor lighting conditions. Moreover, such thermometers require a considerable degree of physical handling by the medical personnel who use them, thus increasing the chances of reinfecting a patient or of cross-contamination between patients. In addition, and as previously pointed out, glass thermometers require a costly sterilization and redistribution process.

Various attempts have been made by the prior art to minimize or eliminate the aforedescribed deficiencies of the glass bulb thermometer by using temperature sensing probes of less fragile construction which are designed to operate in conjunction with direct reading electrical thermometer instrumentation. However, such probes and electrical thermometers have typically proven to be relatively slow in making temperature measurements, and it is still necessary to completely sterilize the probe after each use. Therefore, a large supply of probes is necessary and the relatively expensive sterilization and redistribution costs still remain.

It is also known in the prior art to provide flexible and resilient covers or sheaths for both glass bulb thermometers and electrical probes. However, such prior art devices are still slow and must be physically handled by medical personnel during installation and removal, with the resultant possibility of contamination. Furthermore, such sheaths and covers are generally prone to puncturing, tearing, or being stretched out of shape. In addition, such protective sheaths have not always provided ideal thermal contact between the sheath and the temperature sensing zone of the thermometer or probe and, consequently, the use of such protective sheaths may not produce consistently reliable and accurate results. Moreover, protective sheaths for glass bulb thermometers and electrical probes have typically been rather expensive.

Another solution which has been proposed is the provision of a disposable cover of an electrical probe wherein the cover includes a relatively inexpensive thermally insulating plastic body formed together with a heat conductive metal tip. This arrangement is disclosed thoroughly in U.S. Pat. No. 3,738,479, and although this arrangement functions satisfactorily, forming the cover with a body and tip portion of dissimilar materials is costly and increases the expense of employing the device. Moreover, the arrangement described in that patent includes an electrical probe having a spring biased probe shaft mounted for axial reciprocation with respect to the probe body, thereby adding further to the cost and complexity of the device.

Accordingly, in an effort to reduce the costs of medical care, there exists a need for a truly inexpensive temperature sensing probe and disposable probe cover which provide accurate, reliable, rapid and easily obtained readings, and which obviate the problems of breakage, sterilization, redistribution, and contamination. As will become apparent from the following, the present invention satisfies that need.

SUMMARY OF THE INVENTION

Briefly, and in general terms, the present invention provides a new and improved temperature sensing probe and disposable cover which is arranged to be mounted on such a probe by tight engagement with the temperature sensing tip thereof, and further arranged to be selectively ejected from the probe. The temperature sensing probe and probe cover are particularly adapted for use with electronic temperature measuring instrumentation.

Basically, the present invention includes a generally tubular cover which is intended for use with a temperature sensing probe having a probe shaft rigidly mounted thereon and a thermal sensor device mounted at the distal end of the probe shaft. The geometry of the probe cover is arranged so that, when a probe shaft is inserted into the cover, the thermal sensor at the end of the shaft tightly engages the interior walls of the cover at the distal end thereof, and the body of the cover surrounds the remainder of the probe shaft. Manual means are provided on the probe adjacent the proximal end of the shaft to selectively engage the proximal end of the cover and drive the cover forwardly out of engagement with the thermal sensor device. By this arrangement, the cover is designed to facilitate easy installation onto and ejection from the probe shaft without the need for direct physical contact or handling by the operator.

More specifically, and in a presently preferred embodiment, by way of example and not necessarily by way of limitation, the tubular probe cover is generally cylindrical to accommodate temperature probe shafts which are likewise generally cylindrical, and the cover is open at its proximal end and closed at its distal end. The thermal sensor at the distal end of the probe shaft is also generally cylindrical and, in order to cause the cover to tightly engage the thermal sensor, the interior walls of the cover form a cone converging toward the distal end of the cover. When the cylindrical sensor is pushed into the distal end of the cover, the sensor engages the conical wall of the cover urging the wall radially outwardly. The resulting engagement between the distal end of the cover and the thermal sensor is sufficient to retain the cover on the probe shaft during normal use of the shaft in temperature measurement.

To facilitate economy of manufacture, the cover is preferably formed as a unitary piece, such as by molding, and the specific material employed is preferably high density polyethylene. This material can be molded easily and conveniently to the desired configuration, provides adequate and predictable thermal conductivity and the necessary rigidity to function properly in the manner desired. That is, since the thermal sensor engages the inside of the cover, and the outside of the cover is in contact with the tissue or material whose temperature is to be measured, a positive communication is established for conduction of heat to the thermal sensor. Moreover, since the thermal conductivity and thickness of the cover material are known and can be reliably controlled, accurate and reliable temperature measurements can be taken using the temperature sensing probe and probe cover of this invention.

The probe cover is elongated and dimensioned to completely cover the probe shaft with the proximal end of the cover retained adjacent a movable ejection means mounted on the probe near the proximal end of the probe shaft. The ejection means is arranged to engage the proximal end of the cover and to selectively urge the cover toward the distal end of the shaft. As mentioned above, the cover is constructed of a sufficiently rigid material so that applying an axial force on the proximal end of the cover will move the distal end out of engagement with the thermal sensor and permit the cover to be ejected from the probe shaft.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is an elevational view of a temperature sensing probe and probe cover embodying the present invention and illustrates a cover installed on a probe;

FIG. 2 is an elevational, fragmentary, partly sectional view of the temperature sensing probe and probe cover, similar to the view of FIG. 1, illustrating the probe cover being ejected from the probe shaft, and being partly broken away to illustrate the ejection mechanism;

FIG. 3 is an enlarged, fragmentary, partly sectional view of the probe and probe cover of FIG. 1;

FIG. 4 is an enlarged, fragmentary, partly sectional view of the probe and cover, similar to the view of FIG. 3 and illustrating the probe cover disengaged from the probe shaft;

FIG. 5 is a perspective view of an alternative temperature sensing probe and cover embodying the present invention; and FIG. 6 is a diagrammatic illustration of the spring-loaded ejection mechanism of the probe of FIG. 5 taken generally along line 6—6 of FIG. 5, and showing a circuit controlling switch associated therewith.

DETAILED DESCRIPTION

As shown in the exemplary drawings, the present invention is embodied in a temperature sensing probe, indicated generally by reference numeral 10 in FIG. 1, and a disposable probe cover 12 adapted for use with the probe. More particularly, the probe 10 is shown in the drawings as an electronic temperature responsive device which includes a thermal sensor 14 such as a thermistor or the like, at the distal end of a probe shaft 16 (FIG. 3), and which, when covered by the probe cover 12 can be inserted under the tongue of a patient for the purpose of measuring the patient's body temperature. The temperature sensed is converted to an electrical signal which is directed over a cable 18 as input to appropriate electronic thermometer instrumentation (not shown).

The general construction and use of temperature sensing probes and disposable covers is thoroughly described and illustrated in U.S. Pat. No. 3,738,479 to Stephens N. Sato, which patent is incorporated in this disclosure by reference. Generally, the Sato patent describes the installation of a probe cover onto the probe shaft, making a temperature measurement, and subsequent ejection of the probe cover from the probe shaft after use.

More specifically, as described in the Sato patent, a plurality of covers 12 are provided in a box with an open end 20 (FIG. 2 herein) of each of the covers accessible through an open end of the box. To install a cover on the probe shaft 16, a handle 22 of the probe 10 is grasped by the operator of the probe, and the probe shaft is inserted through the open end 20 of the cover into the main body of the cover. Upon inserting the probe shaft 16 completely into the cover 12, the distal end of the cover engages the thermal sensor 14 in a manner which will be described in greater detail hereinafter, and the cover is thereby retained on the probe shaft and can be removed from the box. With the cover 12 thus installed on the probe 10, a temperature measurement can be made in a conventional manner.

It will be noted from FIGS. 1 and 2 that, when the cover 12 is installed on the probe 10, an ejector button 24 is moved rearwardly. Accordingly, by manually moving the button 24 forwardly, thereby moving a pair of pins 26 or like members forwardly against the proximal end of the cover, the cover can be easily ejected from the probe shaft after use without the necessity of physical touching of the probe cover by the operator.

More specifically, as can best be seen in FIG. 2, the ejector button 24 is mounted on the rearward end of a pusher tube 23 which is slidably received within the handle 22 and which engages the rearward end of a pusher fork 25 at its other end. The pins 26 are formed at the forward end of the pusher fork 25 and are guided for axial reciprocation with respect to the handle 22 by being received in a pair of apertures 27 formed in the handle (FIG. 3).

It will be apparent from the foregoing description of the installation and ejection of a probe cover 12, and the manner in which temperature measurements are made, that a new, clean and disposable probe cover is used for each new temperature measurement, and medical personnel only handle the probe 10 which never comes into direct physical contact with the patient. The probe cover 12 is never touched by personnel at any time, either prior to installation of the cover onto the probe 10, during installation of the cover onto the probe, during an actual temperature measurement, during ejection of the cover from the probe, or after probe disposal. Thus, sanitary conditions are assured and problems of infection and cross-contamination from equipment or physical handling are avoided.

In accordance with the present invention, the probe shaft 16 is rigidly mounted to the temperature sensing probe 10, and the probe 10 is provided with a unitary disposable probe cover 12 which is arranged to tightly surround and engage the sensor 14 at the temperature sensing tip of the probe to place the tip in heat conductive communication with the tissue or material whose temperature is to be sensed. In accordance with a further feature of the invention, the engagement between the disposable probe cover 12 and the temperature sensing tip of the probe shaft 16 is sufficient to retain the probe cover in place on the shaft until it is removed by depressing the ejection button 22 which causes the pins 26 to bear against the proximal end of the cover and move the distal end of the cover out of engagement with the sensor 14. Moreover, the probe and probe cover of this invention are relatively inexpensive to manufacture, convenient and reliable in use, and provide positive and predictable conduction of heat to the temperature sensor 14 while providing the desired protection from communication of disease, without requiring repeated sterilizing of the probe.

Toward the foregoing ends, the probe cover 12 is elongated, generally tubular, and includes an open proximal end 20 and a closed distal end 28. The probe shaft 16 and temperature sensor 14 at the tip of the probe are generally cylindrical, and the inside diameter of the main portion of the tubular cover 12 is dimensioned to loosely surround both the shaft and sensor. For the purpose of tightly engaging the sensor 14, the inside walls 30 adjacent the distal end 28 of the cover converge in a generally conical shape toward the distal end of the cover to an inside diameter smaller than the diameter of the cylindrical sensor 14 (FIG. 4).

As can best be seen in FIG. 3, when the probe shaft 16 is inserted into the cover 12 for mounting of the cover on the shaft, the sensor 14 is forced into the converging conical walls 30 of the cover, thereby deflecting a portion of the conical wall radially outwardly, as can be seen at 32 in FIG. 3. By this arrangement, the cover 12 will tightly engage the temperature sensor 14 for retaining the cover on the shaft while providing positive contact with the sensor to ensure an adequate and predictable path for communication of heat to the sensor.

As previously indicated, the temperature sensing probe 10 and disposable cover 12 of the present invention are particularly adapted for use with electronic thermometer instrumentation. Such instrumentation may be of the type which requires a precisely defined thermodynamic environment in the region of the temperature sensor 14 in order to provide accurate temperature readings, particularly where the instrumentation uses some form of extrapolation to speed up temperature readings on an approximation basis. In this connection, in order to provide accurate and reliable temperature measurements, the portion of the cover 12 which is arranged to tightly surround the sensor 14 at the temperature sensing tip of the probe shaft 16 is preferably constructed to have a predetermined and carefully controlled thickness and thermal conductivity to cooperate with the electronic instrumentation with which the cover and probe 10 are ultimately used. Further, it will be noted that the cover 12 tightly surrounds and engages the sensor 14 around its cylindrical surface to provide a positive path for conduction of heat to the sensor without requiring that the sensor actually contact the inside of the distal end 28 of the cover.

To provide the desired control of wall thickness and thermal conductivity, the cover 12 is preferably molded as a unitary piece of a high density polyethylene material. In addition to its ability to be molded to within satisfactory tolerances and the provision of adequate thermal conductivity, this preferred material is sufficiently resilient to elastically deform and engage the temperature sensor 14, and provides a lightweight and attractive cover which is relatively inexpensive to manufacture. Moreover, this particular material is sufficiently rigid to permit ejection from the probe shaft 16 by the pins 26, as will be described in greater detail below. Of course, any suitable material can be employed for constructing the unitary cover 12, but the above-mentioned high density polyethylene is the presently preferred material.

In order to arrange the cover 12 to be releasably secured to the probe 10, the length of the cover is dimensioned so that the proximal end 20 of the cover abuts a shoulder 34 on the handle 22 when the sensor 14 is in tight engagement with the conical wall 30 adjacent the distal end 28 of the cover. By this arrangement, the distal end of the cover cannot be damaged by inserting the probe shaft 16 too far into the cover and causing the sensor 14 to break through the conical wall 30. It will also be noted from FIG. 3 that the proximal end 20 of the cover 12 is dimensioned to fit loosely over an enlarged proximal end 36 of the probe shaft 16 so that the cover is retained on the shaft 16 solely by the resilient engagement of the conical wall 30 on the sensor 14. Further, the pins 26 are recessed within the apertures 27 in the shoulder 34 and are movable forwardly, in response to depressing the ejection button 24, to engage the proximal end 20 of the cover and urge the cover forwardly out of engagement with the sensor 14.

The cover 12 of the present invention can also be used with an alternative embodiment of a temperature sensing probe 40 (FIG. 5). In this embodiment, the probe 40 is entirely self-contained, having an internal power source 42, such as a battery, and temperature measuring instrumentation 44 (FIG. 6) to provide a digital readout 46 or other suitable temperature indication.

The probe 40 has a probe shaft which is covered by the cover 12, and the cover is retained on the shaft in the same manner as described above. To eject the cover 12 from the probe shaft, a movable member 48 (FIG. 6) is mounted on the probe 40 adjacent the proximal end of the cover and includes an ejection button 50 at the rearward end thereof. The movable member 48 operates in response to depressing the button 50, and abuts the proximal end of the cover urging the cover out of engagement with the probe shaft.

In a preferred embodiment of the probe 40, and as can best be seen in FIG. 6, the button 50 is resiliently biased toward its depressed position by a light spring 52, and the button is held in its undepressed position against the urging of the spring 52, by the engagement of the proximal end of the cover 12 against the movable ejection member 48. In order to ensure that the temperature measuring instrumentation 44 is energized only when a cover 12 is properly in place on the probe shaft, a conventional on-off switch 54 operatively engages the movable ejection member 48 and is arranged to complete a circuit connecting the power source 42 to the instrumentation 44 only when the ejection member is moved rearwardly by the engagement of the proximal end of a cover 12. In the absence of a cover 12, the spring 52 holds the ejection member 48 in the position illustrated diagrammatically in FIG. 6, in which position the switch 54 is open, and the power source 42 is disconnected from the temperature sensing instrumentation 44.

From the foregoing, it wil be appreciated that the temperature sensing probe 10 and probe cover 12 of the present invention are of rugged, reliable and economical construction, and ideal thermal contact is provided between the unitary probe cover 12 and the sensor 14 at the temperature sensing tip of the probe shaft 16, so that consistently accurate and reliable transducer input to the electrical thermometer instrumentation is assured. The probe 10 and probe cover 12 are relatively inexpensive to manufacture, and the probe cover is capable of easy installation and removal without requiring direct physical contact with a human operator. Hence, the problems of sterilization and redistribution are avoided, and problems of infection and cross-contamination are minimized.

While particular forms of the invention have been illustrated and described, it will be apparent that various modifications can be made without departing from the spirit and scope of the invention.

I claim:

1. A temperature sensing device including a sensing probe and a removable probe cover, said device comprising:
    an elongated probe shaft having a temperature sensor at a distal end thereof and being rigidly secured to a handle at a proximal end thereof; and
    a substantially rigid tubular cover, separate from the structure defining said probe, said cover having an open proximal end adjacent said handle and a closed distal end in tight engagement with said temperature sensor, whereby said cover is releasably mounted on said probe by said tight engagement of said cover on said sensor;
    said device further characterized in that said handle includes a movable means for engaging the proximal end of said cover and urging said cover away from said handle and toward the distal end of said probe shaft, and said movable means is movable between a first position toward said distal end of said probe shaft and a second position away from said distal end, and wherein said handle includes means for resiliently biasing said movable means toward said first position, said movable means being held in said second position, against the urging of said biasing means, by the tight engagement of said cover on said sensor.

2. A temperature sensing device as set forth in claim 1 wherein said handle includes a means for activating and deactivating said temperature sensing device, said activating and deactivating means being responsive to said movable means whereby said temperature sensing device is deactivated when said movable means is in said first position and activated when said movable means is in said second position.

3. A temperature sensing probe for use with an ejectable probe cover, said probe comprising:

a probe handle adapted for manual manipulation of said probe;
an elongated probe shaft having a proximal end rigidly mounted to said handle and having a distal end including a temperature sensor arranged to releasably retain said cover on said shaft; and
means on said handle for engaging a proximal end of said cover when said cover is mounted on said probe, said means being selectively movable between a first position retracted toward said handle for retaining said cover on said shaft and a second position extended toward said distal end of said shaft for ejecting said cover from said shaft, and further including means for resiliently biasing said movable means toward said second position, said movable means being held in said first position, against the urging of said biasing means, by the engagement of said proximal end of said cover when said cover is retained on said probe by said temperature sensor.

4. A temperature sensing probe as set forth in claim 3 wherein said handle includes a means for activating and deactivating said temperature sensing probe, said activating and deactivating means being responsive to said movable means whereby said temperature sensing probe is activated when said movable means is in said first position and deactivated when said movable means is in said second position.

5. A self-contained temperature sensing probe for use with an ejectable probe cover, said probe comprising:
    an elongated probe shaft having a proximal end and a distal end, said distal end including a temperature sensor arranged to releasably retain said cover on said shaft; and
    a housing adapted for manual manipulation of said probe and rigidly mounted on said proximal end of said probe shaft, said housing including an internal source of power, temperature measuring instrumentation, a switch connecting said source of power to said temperature sensing instrumentation, means for indicating the temperature sensed, and movable means for engaging a proximal end of said cover and urging said cover away from said housing toward the distal end of said probe shaft, whereby said cover will become disengaged from said sensor and be ejected from said probe shaft, and said movable means being movable between a first position toward said distal end of said probe shaft and a second position away from said distal end, and said housing including means for resiliently biasing said movable means toward said first position, said movable means being held in said second position, against the urging of said biasing means, by the retention of said cover on said sensor, said housing further including an ejection button operatively connected to said movable means for moving said movable means toward said first position, thereby ejecting said cover from said probe shaft.

6. A self-contained temperature sensing probe as set forth in claim 5 wherein said movable means is operatively connected to said switch so that said switch operates to connect said source of power to said temperature sensing instrumentation when said movable means is in said second position, and said switch operates to disconnect said source of power from said temperature sensing instrumentation when said movable means is in said first position.

* * * * *